(12) United States Patent
Yang et al.

(10) Patent No.: US 7,892,512 B2
(45) Date of Patent: *Feb. 22, 2011

(54) METHOD FOR MANUFACTURING HYDROXYLAMINE

(75) Inventors: Shu-Hung Yang, Taipei (TW); Cheng-Fa Hsieh, Taipei (TW); Yi-Bau Hung, Taipei (TW)

(73) Assignee: China Petrochemical Development Corporation, Taipei (TW)

( * ) Notice: Subject to any disclaimer, the term of this patent is extended or adjusted under 35 U.S.C. 154(b) by 621 days.

This patent is subject to a terminal disclaimer.

(21) Appl. No.: 11/784,273

(22) Filed: Apr. 5, 2007

(65) Prior Publication Data

US 2007/0243123 A1    Oct. 18, 2007

(30) Foreign Application Priority Data

Apr. 14, 2006    (TW) .............................. 95113373 A

(51) Int. Cl.
*C01B 21/14* (2006.01)
(52) U.S. Cl. .................................................... 423/387
(58) Field of Classification Search ................ 423/387, 423/302; 564/259, 264; 210/660, 663, 665, 210/668, 681, 688, 702, 704, 705, 722, 723, 210/749, 757, 758; 502/185, 325, 326, 339
See application file for complete search history.

(56) References Cited

U.S. PATENT DOCUMENTS

| 3,514,254 | A | * | 5/1970 | de Rooij | 423/307 |
| 3,767,758 | A | | 10/1973 | Mars et al. | |
| 3,940,442 | A | * | 2/1976 | de Rooij | 564/259 |
| 4,062,927 | A | | 12/1977 | De Rooij et al. | |
| 4,111,842 | A | * | 9/1978 | van Montfoort et al. | 502/183 |
| 4,158,047 | A | * | 6/1979 | van de Moesdijk et al. | 423/387 |
| 4,340,575 | A | * | 7/1982 | Rapp et al. | 423/387 |
| 4,956,168 | A | * | 9/1990 | Wagaman | 423/386 |
| 7,491,846 | B2 | * | 2/2009 | Aoki et al. | 564/300 |

FOREIGN PATENT DOCUMENTS

WO    WO 98/18717 A1 *  5/1998

* cited by examiner

*Primary Examiner*—Wayne Langel
*Assistant Examiner*—Brittany M Martinez
(74) *Attorney, Agent, or Firm*—Peter F. Corless; Dwight D. Kim; Edwards Angell Palmer & Dodge LLP

(57) ABSTRACT

Provided is a method for manufacturing hydroxylamine. In this method, an aqueous reaction medium containing acidic buffer agent and nitrate ions in the presence of a limited amount of metal impurities such as Fe or Cu is introduced into a hydroxylamine synthesis reactor in the presence of catalyst to proceed hydroxylamine synthesis by reduction of nitrate ions with hydrogen gas as reducing agent in the aqueous reaction medium to produce hydroxylamine. The reaction is processed in the aqueous reaction medium with a limited amount of metal impurities or even without metal impurities, such that the selection rate of the hydroxylamine product is increased.

9 Claims, No Drawings

METHOD FOR MANUFACTURING HYDROXYLAMINE

BACKGROUND OF THE INVENTION

1. Field of the Invention

The present invention relates to a method for manufacturing hydroxylamine, particularly a method using hydrogen gas as reducing agent to reduce the nitrate ions to produce hydroxylamine.

2. Description of Related Art

Hydroxylamine related manufacturing steps are generally combined with other manufacturing steps to constitute a recycling system in the industrial application, for example, hydroxylamine-oximation recycling system, i.e., using phosphate salt as an aqueous reaction medium, and using nitric acid, hydrogen gas as raw materials in a catalytic reaction to reduce nitrate ions to hydroxylamine, followed by adding cyclohexanone to the produced hydroxylamine to proceed the oximation reaction to form cyclohexanone oxime. After the foregoing oximation reaction, the resultant reaction mixture was supplemented with nitric acid or subjected to adsorption of nitrous gas to generate nitric acid in order to increase the required amount of nitrate ions, which were consequently transferred into a hydroxylamine reactor for the hydroxylamine synthesis. The reactions could be shown as follows:

Reaction of Hydroxylamine to Produce Hydroxylamine Phosphate $$NH_4NO_3 + 2H_3PO_4 + 3H_2 \rightarrow NH_3OH \cdot H_3PO_4 + NH_4H_2PO_4 + H_2O$$

Oximation Reaction to Produce Cyclohexanone Oxime $$NH_3OH \cdot H_3PO_4 + C_6H_{10}O \rightarrow C_6H_{10}NOH + H_2O + H_3PO_4$$

Supplementation of Nitrate Ion to the Inorganic Phosphate Manufacturing Solution.

$$HNO_3 + H_2PO_4^- \rightarrow NO_3^- + H_3PO_4$$

During the manufacturing process, the aqueous reaction medium was recycled through the hydroxylamine reaction zone and the cyclohexanone oxime synthesizing zone. The content and the quality level of the reaction medium directly affected the efficiency of the hydroxylamine production. U.S. Pat. No. 3,767,758 discloses that the aqueous reaction medium containing metals such as Mo, Rh and Ru declines the selection rate of the hydroxylamine production. U.S. Pat. No. 4,062,927 discloses that acidic solution corrupts the equipments and devices to increase the amount of heavy metal contamination in aqueous reaction medium, particularly, the generated Mo metal contamination may decline the selection rate by 5 to 15%. Said patent teaches the using of ferric ammonium phosphate as a precipitant to remove the metal ions in the reaction medium by co-precipitation. However, the selection rate of the hydroxylamine production is still lower than 87% according to the disclosure of said patents.

Therefore, a method in which the process is simple and effectively increasing the selection rate of the hydroxylamine production is indeed required.

SUMMARY OF THE INVENTION

It is an object of the present invention to provide a method for manufacturing hydroxylamine with high selection rate.

In order to achieve the aforesaid and other purposes, the present invention provides a method for manufacturing hydroxylamine. The present method is carried in an aqueous reaction medium containing acidic buffer agents and nitrate ions in the presence of little metal impurities such as Fe or Cu in the presence of catalyst and utilize hydrogen gas as the reducing agent to reduce nitrate ions to hydroxylamine. The method of the present invention uses the aqueous reactive medium containing low amount or none of metal impurities to process hydroxylamine synthesis reaction in order to increase the selection rate of hydroxylamine production.

EXAMPLES

The present invention is further explained by using exemplified embodiments to clarify the characteristics and effects of the present invention.

The method of the present invention is carried out in an aqueous reaction medium containing acidic buffer agents such as sulfuric acid, phosphoric acid or salts thereof, and nitrate ions with little or without metal impurities, in the presence of catalyst by reducing hydroxylamine with hydrogen gas as the reducing agent to reduce nitrate ions to hydroxylamine. This method can elevate the selection rate of hydroxylamine production by lowering the amount of metal impurities in the aqueous reaction medium. In the present invention, the selection rate of hydroxylamine production is defined as follows:

selection rate of hydroxylamine production=2 times hydroxylamine yield/amount of hydrogen ion consumption×100%.

In one embodiment, the method of the present invention provides an inorganic phosphate solution used as the aqueous manufacturing reaction medium to synthesize hydroxylamine phosphate. The components of the aqueous reaction medium include phosphate ion, ammonium ion, nitrate ion and metal impurities such as Fe, Mo, Ni, Bi, Co, Cu, Mn, Sn, W and Zn etc. In order to prevent the decrease of the selection rate of hydroxylamine production caused by the metal impurities in the aqueous reaction medium. This embodiment illustrates that the aqueous reaction medium was pretreated for the purpose of lowering the amount of the metal impurities therein, particularly, the amount of Fe metal impurity, and then was introduced into the hydroxylamine synthesizing zone to proceed the hydroxylamine synthesis reaction. The pretreatment can be carried by, but not limited to, for example, adding precipitant to react with metal impurities to form precipitated metal complexes which are removed thereafter, or by utilizing resin to adsorb the metal impurities, or by any appropriate methods that can decrease or remove the metal impurities.

According to the method of the present invention, in the hydroxylamine synthesis reactor, the amount of metal impurities such as Fe in the aqueous medium is preferably less than 100 ppm, more preferably less than 75 ppm, still preferably less than 55 ppm or below, further preferably less than 30 ppm. The selective rate of hydroxylamine production is preferably higher than 87%, more preferably higher than 90%, still preferably higher than 91.5%, further preferably higher than 94% or above.

In this embodiment, the reaction step is performed by utilizing phosphate inorganic manufacturing solution as the aqueous reaction medium in the hydroxylamine-oximation recycling system for manufacturing hydroxylamine phosphate. The aqueous reactive medium may be pretreated to remove the metal impurities such as Fe. The reaction step is previously supplemented with nitrate ions before the operation of hydroxylamine synthesis. Based on the total weight of aqueous reactive medium, the amount of nitrate ion in the acidic buffer agent is preferably 13 to 18% by weight, more preferably 14 to 16.5% by weight.

In the method of the present invention, the reaction condition for processing the hydroxylamine synthesis in the hydroxylamine synthesis reactor is not particularly limited. The reaction conditions generally used for the reduction of nitrate ions through the addition of hydrogen gas as reducing agent would be suitable. For example, it may be performed preferably at a temperature of 20 to 100° C., more preferably 30 to 90° C., still preferably 40 to 65° C.; and preferably under a pressure of 10 to 30 kg/cm$^2$, more preferably 18 to 26 kg/cm$^2$, still preferably 18 to 24 kg/cm$^2$; preferably at pH of 0.5 to 6, more preferably 1 to 3.5. As to the constitution of the entering gas for hydroxylamine reaction, based on the total amount of hydrogen gas and nitrogen gas, the content of hydrogen gas is preferably in the range of 30 to 70%, more preferably in the range of 45 to 55%. The catalyst used in the hydroxylamine reaction includes, but not limited to, the noble metal catalyst containing Pd, or Pd—Pt. The carrier for catalyst includes, but not limited to, carbon or aluminum oxide. In general, based on the total weight of catalyst carrier and catalyst, the amount of the noble metal catalyst is preferably in the range of 1 to 25% by weight, more preferably in the range of 5 to 15% by weight. The amount of catalyst used in the hydroxylamine reaction, based on the total amount of the acidic buffer solution, is usually in the range of 0.2 to 5% by weight.

In another embodiment, the reaction step is performed by utilizing phosphate inorganic manufacturing solution as the aqueous reaction medium in the hydroxylamine-oximation recycling system for manufacturing hydroxylamine phosphate. The metal impurities such as Cu the aqueous reaction medium can be removed by use of resin. In this embodiment, the amount of metal impurities such as Cu in the aqueous reaction medium through the process of the hydroxylamine synthesis in the hydroxylamine synthesis reactor is preferably less than 0.9 ppm, more preferably less than 0.09 ppm, still preferably less than 0.05 ppm. The selective rate of the hydroxylamine product is preferably higher than 90%, more preferably higher than 91.5%, still preferably higher than 94%.

In this embodiment, the aqueous reactive medium can be pretreated to remove the metal impurities such as Cu. The reaction system is supplemented with the nitrate ions before processing the hydroxylamine synthesis. Based on the total amount of the aqueous reactive medium, the content of the nitrate ion in the acidic buffer solution is preferably 13 to 18% by weight, more preferably 14 to 16.5% by weight. The reaction condition for processing the hydroxylamine synthesis is not particularly limited. The reaction conditions generally preformed by using hydrogen gas as reducing agent to reduce nitrate ions would be suitable. For example, it can be performed preferably at a temperature of 20 to 100° C., more preferably 30 to 90° C., still preferably 40 to 65° C.; and preferably under a pressure of 10 to 30 kg/cm$^2$, more preferably 18 to 26 kg/cm$^2$, still preferably 18 to 24 kg/cm$^2$; preferably at pH of 0.5 to 6, more preferably 1 to 3.5. As to the constitution of the entering gas for hydroxylamine reaction, based on the total amount of hydrogen gas and nitrogen gas, the content of hydrogen gas is preferably in the range of 30 to 70%, more preferably in the range of 45 to 55%. The catalyst used in the hydroxylamine reaction includes, but not limited to, the noble metal catalyst containing Pd, or Pd—Pt. The carrier for catalyst includes, but not limited to, carbon or aluminum oxide. In general, based on the total weight of catalyst carrier and catalyst, the amount of noble metal catalyst is preferably in the range of 1 to 25% by weight, more preferably in the range of 5 to 15% by weight. The amount of catalyst used in the hydroxylamine reaction, based on the total amount of the acidic buffer solution, is usually in the range of 0.2 to 5% by weight.

The method of the present invention is performed by utilizing aqueous reaction medium with low metal impurities, in which the content of Fe is particularly below 100 ppm or the content of Cu is particularly below 0.9 ppm, so that the selective rate of hydroxylamine product is elevated to more than 87%, or even more than 90%, even to 94% or above.

The invention is further illustrated by the following examples in detail for clarifying the characteristics and effectiveness of the present invention. The detailed embodiments are merely used for clarifying the characteristics of the present invention. The present invention is not limited to the particular embodiment illustrated.

Example 1

The aqueous reaction medium, hydrogen gas and nitrogen gas were introduced into the hydroxylamine synthesizing zone. The hydroxylamine synthesis in the presence of Pd—Pt catalyst, at the temperature of 50° C. under the pressure of 24 kg/cm$^2$. The Fe metal content was analyzed by induced coupled plasma-optical emission spectrometry (ICP-OES) to give a result of Fe content of 98 ppm. The selection rate of hydroxylamine production was 87.20%. Based on the total amount of the aqueous reaction medium, the components of the hydroxylamine reaction medium introduced into the hydroxylamine synthesizing zone were as follows:

[$H^+$] 0.292% by weight
[$H_2PO_4^-$] 20.13% by weight
[$NH_4^+$] 4.17% by weight
[$NH_3OH^+$] 0.082% by weight
[$NO_3^-$] 15.7% by weight Example 2

The aqueous reaction medium, hydrogen gas and nitrogen gas were introduced into the hydroxylamine synthesizing zone. The hydroxylamine synthesis was carried out in the of Pd—Pt catalyst, at the temperature of 50° C. under the pressure of 24 kg/cm$^2$. The Fe metal content was analyzed by induced coupled plasma-optical emission spectrometry (ICP-OES) to give a result of Fe content of 91 ppm. The selection rate of hydroxylamine production was 88.50%. Based on the total amount of the aqueous reaction medium, the components of the hydroxylamine reactive medium introduced into the hydroxylamine synthesizing zone were as follows:

[$H^+$] 0.305% by weight
[$H_2PO_4^-$] 20.17% by weight
[$NH_4^+$] 4.14% by weight
[$NH_3OH^+$] 0.077% by weight
[$NO_3^-$] 16.2% by weight Example 3

The aqueous reaction medium, hydrogen gas and nitrogen gas were introduced into the hydroxylamine synthesizing zone. The hydroxylamine synthesis was carried out in the presence of Pd—Pt catalyst, at the temperature of 50° C. under the pressure of 24 kg/cm$^2$. The Fe metal content was analyzed by induced coupled plasma-optical emission spectrometry (ICP-OES) to give a result of Fe metal content of 85 ppm. The selection rate of hydroxylamine production was 89.21%. Based on the total amount of the aqueous reaction medium, the components of the hydroxylamine reaction medium introduced into the hydroxylamine synthesizing zone were as follows:
  [$H^+$] 0.297% by weight
  [$H_2PO_4^-$] 20.13% by weight
  [$NH_4^+$] 4.14% by weight
  [$NH_3OH^+$] 0.078% by weight
  [$NO_3^-$] 15.25% by weight Example 4

The aqueous reaction medium, hydrogen gas and nitrogen gas were introduced into the hydroxylamine synthesizing zone. The hydroxylamine synthesis was carried out in the presence of Pd—Pt catalyst, at the temperature of 50° C. under the pressure of 24 kg/cm². The Fe metal content was analyzed by induced coupled plasma-optical emission spectrometry (ICP-OES) to give a result of Fe metal content of 72 ppm. The selection rate of hydroxylamine production was 90.50%. Based on the total amount of the aqueous reactive medium, the components of the hydroxylamine reaction medium introduced into the hydroxylamine synthesizing zone were as follows:
  [$H^+$] 0.298% by weight
  [$H_2PO_4^-$] 20.13% by weight
  [$NH_4^+$] 4.19% by weight
  [$NH_3OH^+$] 0.082% by weight
  [$NO_3^-$] 15.6% by weight Example 5

The aqueous reaction medium, hydrogen gas and nitrogen gas were introduced into the hydroxylamine synthesizing zone. The hydroxylamine synthesis was carried out in the presence of Pd—Pt catalyst, at the temperature of 50° C. under the pressure of 24 kg/cm². The Fe metal content was analyzed by induced coupled plasma-optical emission spectrometry (ICP-OES) to give a result of Fe metal content of 34 ppm. The selection rate of hydroxylamine production was 91.50%. Based on the total amount of the aqueous reaction medium, the components of the hydroxylamine reaction medium introduced into the hydroxylamine synthesizing zone were as follows:
  [$H^+$] 0.301% by weight
  [$H_2PO_4^-$] 20.15% by weight
  [$NH_4^+$] 4.12% by weight
  [$NH_3OH^+$] 0.073% by weight
  [$NO_3^-$] 16.38% by weight Example 6

The aqueous reaction medium, hydrogen gas and nitrogen gas were introduced into the hydroxylamine synthesizing zone. The hydroxylamine synthesis was carried out in the presence of Pd—Pt catalyst, at the temperature of 50° C. under the pressure of 24 kg/cm². The Fe metal content was analyzed by induced coupled plasma-optical emission spectrometry (ICP-OES) to give a result of Fe metal content of 25 ppm. The selection rate of hydroxylamine production was 94.20%. Based on the total amount of the aqueous reaction medium, the components of the hydroxylamine reaction medium introduced into the hydroxylamine synthesizing zone were as follows:
  [$H^+$] 0.304% by weight
  [$H_2PO_4^-$] 20.18% by weight
  [$NH_4^+$] 4.08% by weight
  [$NH_3OH^+$] 0.064% by weight
  [$NO_3^-$] 16.4% by weight Comparative Example 1

The aqueous reaction medium, hydrogen gas and nitrogen gas were introduced into the hydroxylamine synthesizing zone. The hydroxylamine synthesis was carried out in the presence of Pd—Pt catalyst, at the temperature of 50° C. under the pressure of 24 kg/cm². The Fe metal content was analyzed by induced coupled plasma-optical emission spectrometry (ICP-OES) to give a result of Fe metal content of 116 ppm. The selection rate of hydroxylamine production was 85.21%. Based on the total amount of the aqueous reaction medium, the components of the hydroxylamine reaction medium introduced into the hydroxylamine synthesizing zone were as follows:
  [$H^+$] 0.290% by weight
  [$H_2PO_4^-$] 20.11% by weight
  [$NH_4^+$] 4.17% by weight
  [$NH_3OH^+$] 0.079% by weight
  [$NO_3^-$] 14.34% by weight Comparative Example 2

The aqueous reaction medium, hydrogen gas and nitrogen gas were introduced into the hydroxylamine synthesizing zone. The hydroxylamine synthesis was carried out in the presence of Pd—Pt catalyst, at the temperature of 50° C. under the pressure of 24 kg/cm². The Fe metal content was analyzed by induced coupled plasma-optical emission spectrometry (ICP-OES) to give a result of Fe metal content of 105 ppm. The selection rate of hydroxylamine production was 86.80%. Based on the total amount of the aqueous reaction medium, the components of the hydroxylamine reaction medium introduced into the hydroxylamine synthesizing zone were as follows:
  [$H^+$] 0.293% by weight
  [$H_2PO_4^-$] 20.13% by weight
  [$NH_4^+$] 4.15% by weight
  [$NH_3OH^+$] 0.074% by weight
  [$NO_3^-$] 15.2% by weight Comparative Example 3

The aqueous reaction medium, hydrogen gas and nitrogen gas were introduced into the hydroxylamine synthesizing zone. The hydroxylamine synthesis was carried out in the presence of Pd—Pt catalyst, at the temperature of 50° C. under the pressure of 24 kg/cm². The Fe metal content was analyzed by induced coupled plasma-optical emission spectrometry (ICP-OES) to give a result of Fe metal content of 143 ppm. The selection rate of hydroxylamine production was 84.35%. Based on the total amount of the aqueous reaction medium, the components of the hydroxylamine reaction medium introduced into the hydroxylamine synthesizing zone were as follows:
  [$H^+$] 0.295% by weight
  [$H_2PO_4^-$] 20.13% by weight
  [$NH_4^+$] 4.14% by weight
  [$NH_3OH^+$] 0.074% by weight
  [$NO_3^-$] 15.24% by weight Table 1 Shows the relationships between the Fe metal contents in the aqueous reaction medium and the selection rates of hydroxylamine production in the above examples.

TABLE 1

|  | Fe Metal content (ppm) | Selection rate (%) |
|---|---|---|
| Example 1 | 98 | 87.20 |
| Example 2 | 91 | 88.50 |
| Example 3 | 85 | 89.21 |
| Example 4 | 72 | 90.50 |
| Example 5 | 34 | 91.50 |
| Example 6 | 25 | 94.20 |
| Comparative Example 1 | 116 | 85.21 |
| Comparative Example 2 | 105 | 86.80 |
| Comparative Example 3 | 143 | 84.35 |

Example 7

The aqueous reaction medium, hydrogen gas and nitrogen gas were introduced into the hydroxylamine synthesizing zone. The hydroxylamine synthesis was carried out in the presence of Pd—Pt catalyst, at the temperature of 50° C. under the pressure of 24 kg/cm². The Cu metal content was analyzed by induced coupled plasma-optical emission spectrometry (ICP-OES) to give a result of Cu metal content of 0.83 ppm. The selection rate of hydroxylamine production was 90.5%. Based on the total amount of the aqueous reaction medium, the components of the hydroxylamine reaction medium introduced into the hydroxylamine synthesizing zone were as follows:

[$H^+$] 0.298% by weight
[$H_2PO_4^-$] 20.13% by weight
[$NH_4^+$] 4.19% by weight
[$NH_3OH^+$] 0.082% by weight
[$NO_3^-$] 15.6% by weight

Example 8

The aqueous reaction medium, hydrogen gas and nitrogen gas were introduced into the hydroxylamine synthesizing zone. The hydroxylamine synthesis was carried out in the presence of Pd—Pt catalyst, at the temperature of 50° C. under the pressure of 24 kg/cm². The Cu metal content was analyzed by induced coupled plasma-optical emission spectrometry (ICP-OES) to give a result of Cu metal content of 0.08 ppm. The selection rate of hydroxylamine production was 91.50%. Based on the total amount of the aqueous reaction medium, the components of the hydroxylamine reaction medium introduced into the hydroxylamine synthesizing zone were as follows:

[$H^+$] 0.295% by weight
[$H_2PO_4^-$] 20.13% by weight
[$NH_4^+$] 4.15% by weight
[$NH_3OH^+$] 0.082% by weight
[$NO_3^-$] 15.8% by weight

Example 9

The aqueous reaction medium, hydrogen gas and nitrogen gas were introduced into the hydroxylamine synthesizing zone. The hydroxylamine synthesis was carried out in the presence of Pd—Pt catalyst, at the temperature of 50° C. under the pressure of 24 kg/cm². The Cu metal content was analyzed by induced coupled plasma-optical emission spectrometry (ICP-OES) to give a result of Cu metal content of 0.03 ppm. The selection rate of hydroxylamine production was 94.20%. Based on the total amount of the aqueous reaction medium, the components of the hydroxylamine reaction medium introduced into the hydroxylamine synthesizing zone were as follows:

[$H^+$] 0.304% by weight
[$H_2PO_4^-$] 20.18% by weight
[$NH_4^+$] 4.08% by weight
[$NH_3OH^+$] 0.064% by weight
[$NO_3^-$] 16.4% by weight

Comparative Example 4

The aqueous reaction medium, hydrogen gas and nitrogen gas were introduced into the hydroxylamine synthesizing zone. The hydroxylamine synthesis was carried out in the presence of Pd—Pt catalyst, at the temperature of 50° C. under the pressure of 24 kg/cm². The Cu metal content was analyzed by induced coupled plasma-optical emission spectrometry (ICP-OES) to give a result of Cu metal content of 1.05 ppm The selection rate of hydroxylamine production was 85.21%. Based on the total amount of the aqueous reaction medium, the components of the hydroxylamine reaction medium introduced into the hydroxylamine synthesizing zone were as follows:

[$H^+$] 0.290% by weight
[$H_2PO_4^-$] 20.11% by weight
[$NH_4^+$] 4.17% by weight
[$NH_3OH^+$] 0.079% by weight
[$NO_3^-$] 14.34% by weight

Comparative Example 5

The aqueous reaction medium, hydrogen gas and nitrogen gas were introduced into the hydroxylamine synthesizing zone. The hydroxylamine synthesis was carried out in the presence of Pd—Pt catalyst, at the temperature of 50° C. under the pressure of 24 kg/cm². The Cu metal content was analyzed by induced coupled plasma-optical emission spectrometry (ICP-OES) to give a result of Cu metal content of 0.97 ppm. The selection rate of hydroxylamine production was 86.8%. Based on the total amount of the aqueous reaction medium, the components of the hydroxylamine reaction medium introduced into the hydroxylamine synthesizing zone were as follows:

[$H^+$] 0.293% by weight
[$H_2PO_4^-$] 20.13% by weight
[$NH_4^+$] 4.15% by weight
[$NH_3OH^+$] 0.074% by weight
[$NO_3^-$] 15.2% by weight Table 2 Shows the relationships between the Cu metal contents in the aqueous reaction medium and the selection rates of the hydroxylamine production in the above examples.

TABLE 2

|  | Cu metal content (ppm) | Selection rate (%) |
|---|---|---|
| Example 7 | 0.83 | 90.50 |
| Example 8 | 0.08 | 91.50 |
| Example 9 | 0.03 | 94.20 |
| Comparative Example 4 | 1.05 | 85.21 |
| Comparative Example 5 | 0.97 | 86.80 |

From the results of the brief comparison of the above Examples with the Comparative Examples, it is found that low amount of metal impurities contained in the aqueous reaction medium for the hydroxylamine synthesis reaction could significantly promote the selection rate of the hydroxylamine production. In particular, the Fe metal impurity should be below 100 ppm or the Cu metal impurity should be below 0.9 ppm.

The above examples only exemplify the principles and the effects of the present invention. They are not used to limit this invention. It is possible for those skilled in the art to modify and or alter the above examples for carrying out this invention without contravening its spirit and scope. Therefore, the protection scope of this invention should be indicated as stated by the following claims.

What is claimed is:

1. A method for manufacturing hydroxylamine, comprising the steps of:
   pretreating an aqueous reaction medium taken from an oximation reaction of a hydroxylamine-oxime cycling process to reduce the amount of Fe metal in the aqueous medium to less than 100 ppm, wherein the aqueous reaction medium comprises an acidic buffer agent, nitrate ions and metal impurities;
   introducing the aqueous reaction medium into a hydroxylamine synthesis reactor; and
   reducing the nitrate ions to the hydroxylamine in the presence of a catalyst in the aqueous reaction medium.

2. The method for manufacturing hydroxylamine according to claim 1, wherein the amount of Fe metal is reduced to less than 75 ppm.

3. The method for manufacturing hydroxylamine according to claim 2, wherein the amount of Fe metal is reduced to less than 55 ppm.

4. The method for manufacturing hydroxylamine according to claim 1, wherein the acidic buffer agent is selected from the group consisting of sulfuric acid, phosphoric acid and salts thereof.

5. The method for manufacturing hydroxylamine according to claim 4, wherein the acidic buffer agent is phosphate.

6. The method for manufacturing hydroxylamine according to claim 1, wherein the step of reducing the nitrate ions to the hydroxylamine is carried out at a temperature of from 20 to 100° C.

7. The method for manufacturing hydroxylamine according to claim 1, wherein the step of reducing the nitrate ions to the hydroxylamine is carried out at a pressure of from 10 to 30 $kg/cm^2$.

8. The method for manufacturing hydroxylamine according to claim 1, wherein the step of reducing the nitrate ions to the hydroxylamine is carried out at a pH of from 0.5 to 6.

9. The method for manufacturing hydroxylamine according to claim 1, wherein the catalyst is selected from the group consisting of Pd and Pd—Pt noble metals.

* * * * *